(12) United States Patent
Boddakayala et al.

(10) Patent No.: US 11,888,140 B2
(45) Date of Patent: Jan. 30, 2024

(54) BATTERY PACK WITH THERMAL BARRIER

(71) Applicant: Ford Global Technologies, LLC, Dearborn, MI (US)

(72) Inventors: Bhaskara Rao Boddakayala, Troy, MI (US); Saravanan Paramasivam, South Lyon, MI (US); Suriyaprakash Ayyangar Janarthanam, Canton, MI (US); Mohammadreza Eftekhari, Novi, MI (US); Kanchana Perumalla, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 490 days.

(21) Appl. No.: 17/115,103

(22) Filed: Dec. 8, 2020

(65) Prior Publication Data

US 2022/0181714 A1    Jun. 9, 2022

(51) Int. Cl.
*H01M 10/658* (2014.01)
*H01M 50/24* (2021.01)
*H01M 50/224* (2021.01)
*H01M 50/204* (2021.01)
*H01M 10/625* (2014.01)
*H01M 50/249* (2021.01)
*H01M 50/227* (2021.01)

(52) U.S. Cl.
CPC ....... *H01M 10/658* (2015.04); *H01M 10/625* (2015.04); *H01M 50/204* (2021.01); *H01M 50/224* (2021.01); *H01M 50/227* (2021.01); *H01M 50/24* (2021.01); *H01M 50/249* (2021.01); *H01M 2220/20* (2013.01)

(58) Field of Classification Search
CPC ... H01M 10/658; H01M 50/24; H01M 50/222
See application file for complete search history.

(56) References Cited

U.S. PATENT DOCUMENTS

| | | |
|---|---|---|
| 6,966,945 B1 | 11/2005 | Mazany et al. |
| 9,331,321 B2 | 5/2016 | Berger et al. |
| 2021/0376405 A1* | 12/2021 | Browning ............. B32B 19/041 |
| 2022/0262539 A1* | 8/2022 | Huang ................ H01M 50/282 |
| 2023/0035787 A1* | 2/2023 | Middendorf .......... H01M 50/28 |

FOREIGN PATENT DOCUMENTS

| | | |
|---|---|---|
| WO | 2020014470 A1 | 1/2020 |
| WO | 2020023357 A1 | 1/2020 |
| WO | 2020047846 A1 | 3/2020 |

\* cited by examiner

*Primary Examiner* — Jonathan G Jelsma
(74) *Attorney, Agent, or Firm* — David B. Kelley; Carlson, Gaskey & Olds, P.C.

(57) ABSTRACT

An article, such as a battery pack system, includes a battery pack that is comprised of a plurality of battery cells. An external housing covers at least a portion of the battery pack. A silicate-based thermal barrier coating is configured to block heat emitted from the battery pack.

15 Claims, 3 Drawing Sheets

BATTERY PACK WITH THERMAL BARRIER

TECHNICAL FIELD

This disclosure relates to vehicles and, more particularly, to thermal barriers in battery packs for vehicles.

BACKGROUND

Electrified vehicles are driven by one or more electric motors. The electric motor or motors are powered by a battery pack, often referred to as a traction battery pack. The battery pack may be packaged in a battery case underneath the vehicle, on the vehicle frame. The battery cells of the battery pack can generate heat during charging and during discharging operations. The heat may be dissipated to facilitate maintaining the battery pack at temperatures that are optimal for battery performance. Heat exchanger "cold plates," coolant circuits, or other heat exchanging devices may be used for heat removal, although some heat may also dissipate through the battery cover.

SUMMARY

An article according to an example of the present disclosure includes a battery pack comprised of a plurality of battery cells, a housing external of the battery pack and covering at least a portion of the battery pack, and a silicate-based thermal barrier coating configured to block heat emitted from the battery pack.

In a further embodiment of any of the foregoing embodiments, the silicate-based thermal barrier coating is comprised of silicate, thermal barrier particles, and non-ionic surfactant.

In a further embodiment of any of the foregoing embodiments, the silicate-based thermal barrier coating includes, by weight, 35-45% of sodium silicate, 1-2% of thermal barrier particles, and 0.09-0.15% of non-ionic surfactant.

In a further embodiment of any of the foregoing embodiments, the thermal barrier particles are selected from the group consisting of kaolin, vermiculite, aluminum oxide, aluminum nitride, graphite, and combinations thereof.

In a further embodiment of any of the foregoing embodiments, the housing includes a substrate, and the silicate-based thermal barrier coating is disposed on the substrate.

In a further embodiment of any of the foregoing embodiments, the substrate is metallic.

In a further embodiment of any of the foregoing embodiments, the substrate is polymeric.

A further embodiment of any of the foregoing embodiments includes a thermal barrier layer attached to the silicate-based thermal barrier coating.

In a further embodiment of any of the foregoing embodiments, the thermal barrier layer is selected from the group consisting of a fabric layer, and foam layer, and combinations thereof.

In a further embodiment of any of the foregoing embodiments, the silicate-based thermal barrier coating is between adjacent ones of the battery cells.

An article according to an example of the present disclosure includes a battery pack comprised of a plurality of battery cells, and a housing external of the battery pack and covering at least a portion of the battery pack. The housing is configured as a sandwich structure including first and second polymer face layers and a thermal barrier layer disposed there between.

In a further embodiment of any of the foregoing embodiments, the first and second polymer face layers are sheet molding compounds comprised of glass-filled polymeric sheets.

In a further embodiment of any of the foregoing embodiments, at least one of the first or second polymer face layers includes thermal barrier particles.

In a further embodiment of any of the foregoing embodiments, the thermal barrier particles are selected from the group consisting of basalt particles, vermiculite, ceramic particles, glass microspheres, and combinations thereof.

In a further embodiment of any of the foregoing embodiments, the thermal barrier layer is selected from the group consisting of a fabric layer, and foam layer, and combinations thereof.

In a further embodiment of any of the foregoing embodiments, the thermal barrier layer includes a fabric layer having fibers selected from the group consisting of basalt fibers, ceramic fibers, and combinations thereof.

A further embodiment of any of the foregoing embodiments includes a silicate-based thermal barrier coating disposed between the first and second metal/polymer face layers, the silicate-based thermal barrier coating having, by weight, 35-45% of sodium silicate, 1-2% of thermal barrier particles, and 0.09-0.15% of non-ionic surfactant.

An article according to an example of the present disclosure includes a battery pack comprised of a plurality of battery cells, and a housing external of the battery pack covering at least a portion of the battery pack. The battery pack hays an inter-cell thermal barrier including first and second thermal barrier layers and a heat sink layer there between.

In a further embodiment of any of the foregoing embodiments, the thermal barrier layers are fabric layers having fibers selected from the group consisting of basalt fibers, ceramic fibers, and combinations thereof, and the heat sink layer is a metallic sheet.

In a further embodiment of any of the foregoing embodiments, the inter-cell thermal barrier further includes a silicate-based thermal barrier coating having, by weight, 35-45% of sodium silicate, 1-2% of thermal barrier particles, and 0.09-0.15% of non-ionic surfactant.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
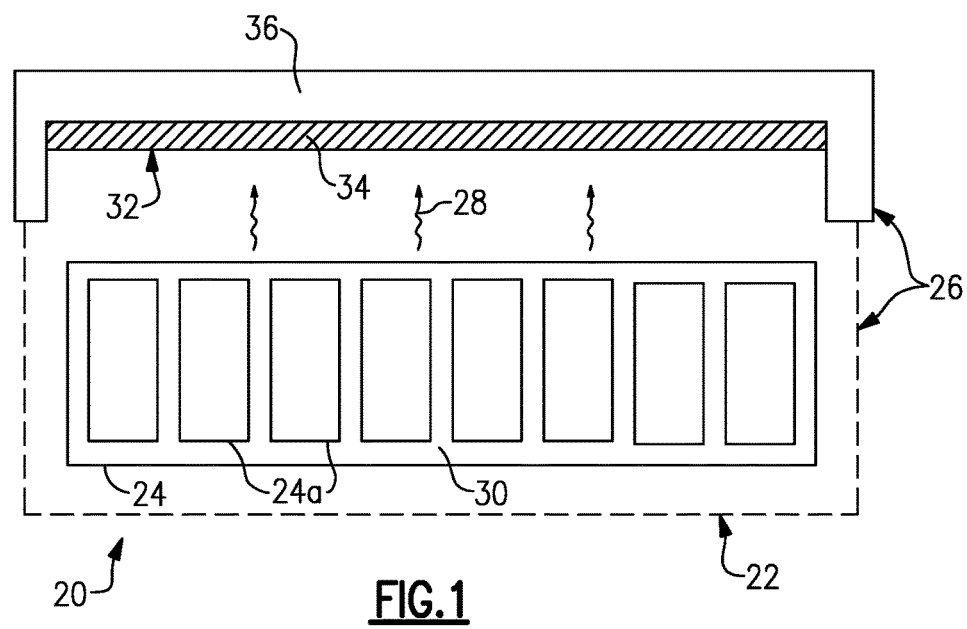
FIG. 1 illustrates a battery pack that has a thermal barrier coating.

FIG. 1 schematically illustrates an article 20, namely a battery pack system, for an electrified vehicle. The article 20 includes a battery housing 22 that at least partially covers an interior region in which there is disposed a battery pack 24 that is made up of a plurality of battery cells 24a. The housing 22 may be formed of polymer, metal alloy, or combinations of these materials. The battery housing 22 includes housing walls 26, a portion of which is shown as a dashed line and another portion of which is shown graphically.

In some instances, such as an electrical event or a charging event, the battery pack 24 may emit high temperature gases, as indicated at 28. This may result in an increase in temperature at the outside surfaces of the housing 22. In this regard, the article 20 includes a thermal barrier 32 that facilitates blocking the heat 28 in order to maintain the outside surfaces of the housing 22 at lower temperatures. Actual performance of a given implementation may be tested by attaching a thermocouple on the outside surface of the housing 22, generating a temperature of approximately 700° C. at the interior region for a set amount of time (e.g., 2 minutes), and recording the change in temperature at the outside surface. The same test can be conducted on a control sample housing for comparison.

In the illustrated example, the thermal barrier 32 includes a thermal barrier coating 34. The coating 34 is disposed on an inner surface of the housing walls 26 (facing the battery pack 24), which thereby serves as a substrate 36. The coating 34 may cover selected portions of the housing walls 26, such as portions that are adjacent to hot spots, or entirely cover the inner surface of the housing walls 26. The substrate 36 may be made of the same or different material as other parts of the housing walls 26. For instance, the substrate 36 is made of a metal alloy, such as steel or aluminum alloy, or polymer, such as polyester.

The thermal barrier coating 34 is a silicate-based thermal barrier coating and has low thermal conductivity so as to serve as a thermal insulator. The term "silicate-based" indicates that silicate is, by weight, the most abundant constituent in the coating 34. As an example, the coating 34 is comprised of silicate, thermal barrier particles, and non-ionic surfactant. Examples of the thermal barrier particles include kaolin, ceramic, graphite, and combinations thereof. Examples of the non-ionic surfactant include 0.09%-0.15% by weight. For instance, the coating 34 has, by weight, 35-45% of sodium silicate, 1-3% of thermal barrier particles, and 0.09%-0.15% of non-ionic surfactant. In one specific example, the coating 34 has, by weight, 0.9% kaolin, 0.1% non-ionic surfactant, and a remainder of sodium silicate with deionized water. The silicate-based thermal barrier coating is highly heat resistant, but also has good chemical and corrosion resistance, is moisture repellant, is sulfur-free, and does not promote corrosion.

The application of the coating 34 to the substrate 36 is not particularly limited. For example, the coating 34 may be applied by rolling, spraying, or brushing a coating solution that contains the coating constituents onto the substrate 36, followed by curing the coating solution. In one example, the coating solution is thermally cured to remove solvent, such as DI water, and to react coating constituents. For instance, when heated above a reaction temperature, kaolin or other thermal barrier particles react with the silicate to produce a ceramic phase that may further lower the bulk thermal conductivity of the coating 34.

Figure 2:
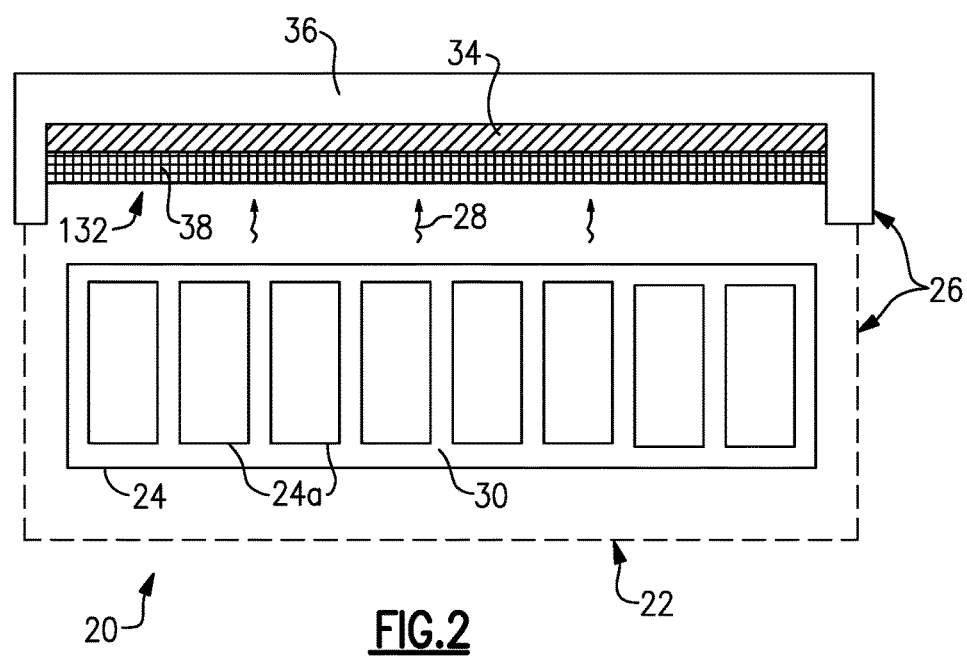
FIG. 2 illustrates a battery pack that additionally has a thermal barrier layer.

FIG. 2 illustrates a further example of the article 20. In this disclosure, like reference numerals designate like elements where appropriate and reference numerals with the addition of one-hundred or multiples thereof designate modified elements that are understood to incorporate the same features and benefits of the corresponding elements. Here, the article 20 includes a thermal barrier 132 that has a thermal barrier layer 38 in addition to the coating 34. The thermal barrier layer 38 is attached to the coating 34 and serves to further reduce heat dissipation through the housing wall 26. The thermal barrier layer 38 is generally pliable so as to be able to conform to contours of the housing walls 26. For instance, the thermal barrier layer 38 is selected from a fabric layer, foam layer, or a combination thereof. Example fabric layers include silicate fiber fabrics and basalt fiber fabrics. Such fabrics may be woven or non-woven. Example foam layers include malamine foam and aerogel foam (e.g., silica or metal oxide).

The thermal barrier layer 38 may be incorporated during application of the coating 34 onto the substrate 36 by applying the layer 38 on the coating solution prior to full cure. If the thermal barrier layer 38 is porous, the coating solution may at least partially infiltrate the thermal barrier layer 38 and thereby bond it to the substrate 36. Alternatively, an adhesive may be provided between the coating 34 and the thermal barrier layer 38 to bond the thermal barrier layer 38 to the substrate 36.

Figure 3:
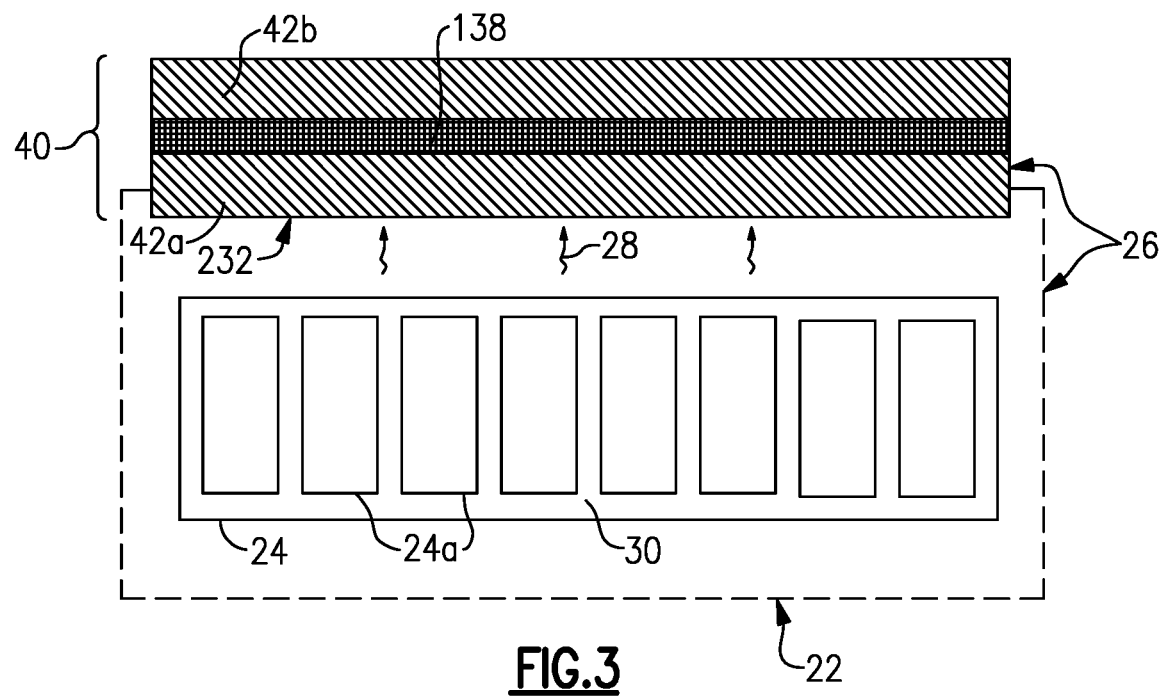
FIG. 3 illustrates a battery pack that has a thermal barrier layer between polymer face layers.

FIG. 3 illustrates another example article 120 that includes thermal barrier 232. In this example, the thermal barrier 232 is configured as a sandwich structure 40. The structure 40 is comprised of first and second polymer face layers 42a/42b and a thermal barrier layer 138 disposed there between. The polymer face layers 42a/42b protect the thermal barrier layer 138 from mechanical damage that may occur during handling and/or vehicle operation.

As an example, the polymer face layers 42a/42b are formed of polyester, such as sheet molding compound (SMC). Like barrier 38, the thermal barrier layer 138 is selected from a fabric layer, foam layer, or a combination thereof. Example fabric layers include silicate fiber fabrics and basalt fiber fabrics. Such fabrics may be woven or non-woven. Example foam layers include malamine foam and aerogel foam (e.g., silica or metal oxide).

The thermal barrier 232 may be fabricated via a molding process. For example, the thermal barrier layer 138 is arranged between two sheets of SMC or other desired polymer and the resulting arrangement is pressure-molded under heat to consolidate the structure 40 to the desired geometry. Alternatively, the SMC or other desired polymer may be consolidated via resin or vacuum impregnation such that the thermal barrier layer 138 becomes embedded in the SMC or polymer.

Figure 4:
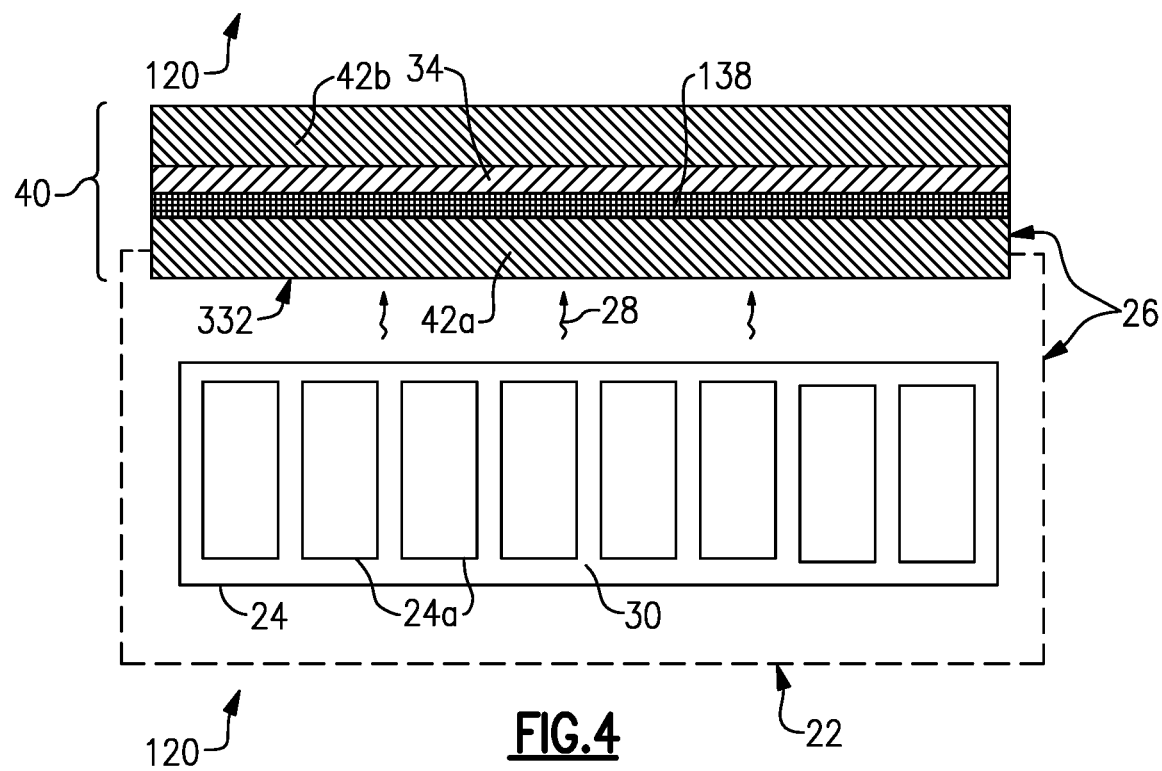
FIG. 4 illustrates a battery pack that additionally has a thermal barrier coating between the metal/polymer face layers.

FIG. 4 illustrates a further example of the article 120. Here, the sandwich structure 40 additionally includes the thermal barrier coating 34, the details of which are described above, to further insulate the housing 22 against heat loss.

Figure 5:
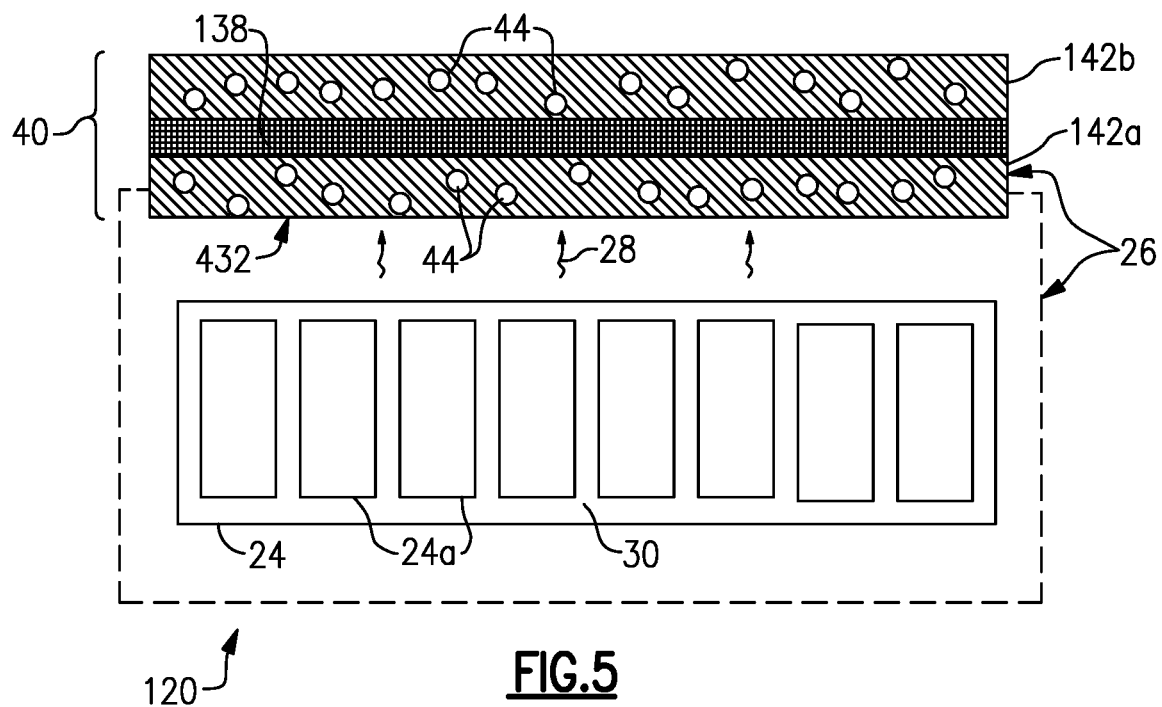
FIG. 5 illustrates a battery pack in which the polymer face layers have thermal barrier particles.

FIG. 5 illustrates a further example of the article 120 that is similar to the example of FIG. 3. In this example, however, the sandwich structure 40 includes first and second polymer face layers 142a/142b that contain thermal barrier particles 44 to further insulate the housing 22. The particles 44 are dispersed through the polymer of the layers 142a/142b. For instance, the particles 44 are selected from basalt particles, vermiculite particles, ceramic particles, glass microspheres, and combinations thereof and are present in each of the layers 142a/142b in an amount, by weight, of 0.1%-10%, such as from 4%-6%. of glass microspheres. In general, the particles 44 may also change other properties of the layers 142a/142b in addition to thermal conductivity. As a result, the amount is kept low in order to minimize the effect on other properties like impact strength.

Figures 6, 7:
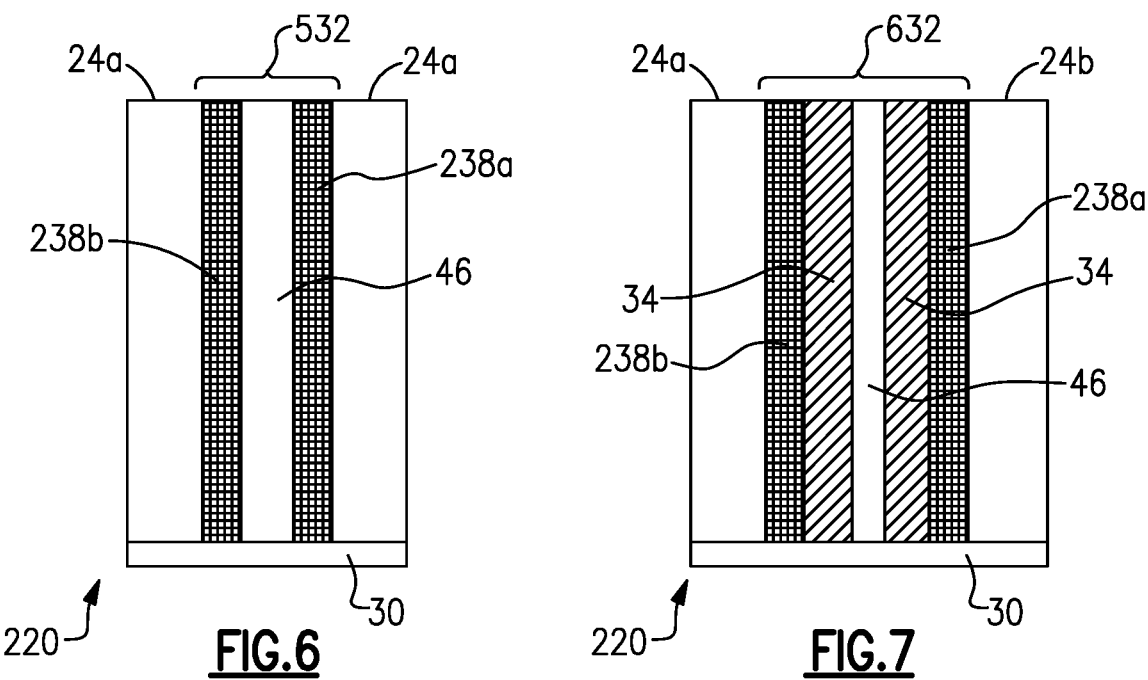
FIG. 6 illustrates a portion of a battery pack that has an inter-cell thermal barrier.
FIG. 7 illustrates a portion of a battery pack that additionally includes a thermal barrier coating.

FIG. 6 illustrates selected portions of another example article 220 that includes thermal barrier 532. In this example, the thermal barrier 532 is an inter-cell thermal barrier that is disposed between two battery cells 24a. In that regard, in further examples, the thermal barrier 532 is used in each of the prior examples in FIGS. 1-5. However, it is to be understood that the thermal barrier 532 may alternatively be used in other battery packs.

The thermal barrier 532 is comprised of first and second thermal barrier layers 238a/238b and a heat sink layer 46 there between. Like barrier 38, the thermal barrier layers 238a/238b are selected from a fabric layer, foam layer, or a combination thereof. Example fabric layers include silicate fiber fabrics and basalt fiber fabrics. Such fabrics may be woven or non-woven. Example foam layers include malamine foam and aerogel foam (e.g., silica or metal oxide). The heat sink layer 46 is made of a metal alloy, such as steel or an aluminum alloy. The thermal barrier layers 238a/238b may be trapped between the battery cells 24a and the heat sink layer 46 or affixed to the heat sink layer 46 using known flame retardant high temperature inorganic adhesives.

The thermal barrier 532 serves to thermally segregate the battery cells 24a from each other. For instance, thermal barrier layer 238a substantially blocks heat emitted by the right-hand side battery cell 24a. Heat that does conduct through the thermal barrier layer 238a is absorbed by the heat sink layer 46 and removed, such as through the cooling device 30. Thus, heat from the right-hand side battery cell 24a is isolated from the left-hand side battery cell 24a and vice versa for the left-hand side battery cell 24a via the left-hand side thermal barrier layer 238b. Accordingly, if there is a temperature excursion in one of the battery cells 24a, it is less likely that it will affect the other battery cell 24a.

The thermal barrier 532 may be variably spaced with respect to the battery cells 24a. For instance, the thermal barrier 532 is situated between two immediately adjacent battery cells 24a to segregate each individual battery cell or between groups of cells to segregate the groups. For instance, the thermal barrier 532 is situated after every second battery cell 24a or after every fourth battery cell 24a. The spacing that is selected may be based on performance requirements for the particular battery pack implementation and may be used with other battery features, such as expansion foam.

FIG. 7 illustrates selected portions of a further example of the article 220 that includes thermal barrier 632. Here, the thermal barrier 632 is the same as thermal barrier 532 except that it additionally includes one or more layers of the thermal barrier coating 34 for additional thermal insulation, which is described above. For instance, the coating 34 is applied onto one side of the heat sink layer 46 between the heat sink layer 46 and one of the thermal barrier layers 238a/238b or is applied on both sides of the heat sink 46 between the heat sink layer 46 and each of the thermal barrier layers 238a/238b.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article comprising:
   a battery pack comprised of a plurality of battery cells;
   a housing external of the battery pack and covering at least a portion of the battery pack; and
   a silicate-based thermal barrier coating configured to block heat emitted from the battery pack, the silicate-based thermal barrier coating including, by total weight of the silicate-based thermal barrier coating, 35-45% of sodium silicate, 1-2% of thermal barrier particles, and 0.09-0.15% of non-ionic surfactant.

2. The article as recited in claim 1, wherein the thermal barrier particles are selected from the group consisting of kaolin, vermiculite, aluminum oxide, aluminum nitride, graphite, and combinations thereof.

3. The article as recited in claim 1, wherein the housing includes a substrate, and the silicate-based thermal barrier coating is disposed on the substrate.

4. The article as recited in claim 3, wherein the substrate is metallic.

5. The article as recited in claim 3, wherein the substrate is polymeric.

6. The article as recited in claim 3, further comprising a thermal barrier layer attached to the silicate-based thermal barrier coating.

7. The article as recited in claim 6, wherein the thermal barrier layer is selected from the group consisting of a fabric layer, and foam layer, and combinations thereof.

8. The article as recited in claim 1, wherein the silicate-based thermal barrier coating is between adjacent ones of the battery cells.

9. An article comprising:
   a battery pack comprised of a plurality of battery cells;
   a housing external of the battery pack and covering at least a portion of the battery pack, the housing configured as a sandwich structure including first and second polymer face layers and a thermal barrier layer disposed there between; and
   a silicate-based thermal barrier coating disposed between the first and second polymer face layers, the silicate-based thermal barrier coating having, by total weight of the silicate-based thermal barrier coating, 35-45% of sodium silicate, 1-2% of thermal barrier particles, and 0.09-0.15% of non-ionic surfactant.

10. The article as recited in claim 9, wherein the first and second polymer face layers are sheet molding compounds comprised of glass-filled polymeric sheets.

11. The article as recited in claim 10, wherein at least one of the first or second polymer face layers includes thermal barrier particles.

12. The article as recited in claim 11, wherein the thermal barrier particles are selected from the group consisting of basalt particles, vermiculite, ceramic particles, glass microspheres, and combinations thereof.

13. The article as recited in claim 10, wherein the thermal barrier layer is selected from the group consisting of a fabric layer, and foam layer, and combinations thereof.

14. The article as recited in claim 9, wherein the thermal barrier layer includes a fabric layer having fibers selected from the group consisting of basalt fibers, ceramic fibers, and combinations thereof.

15. An article comprising:
   a battery pack comprised of a plurality of battery cells;

a housing external of the battery pack and covering at least a portion of the battery pack; and the battery pack having an inter-cell thermal barrier including first and second thermal barrier layers and a heat sink layer there between, and a silicate-based thermal barrier coating, wherein the first and second thermal barrier layers are fabric layers having fibers selected from the group consisting of basalt fibers, ceramic fibers, and combinations thereof, the heat sink layer is a metallic sheet, and the silicate-based thermal barrier coating having, by total weight of the silicate-based thermal barrier coating, 35-45% of sodium silicate, 1-2% of thermal barrier particles, and 0.09-0.15% of non-ionic surfactant.

* * * * *